United States Patent [19]

Saito et al.

[11] Patent Number: 4,623,231
[45] Date of Patent: Nov. 18, 1986

[54] SYSTEM FOR AUTOMATICALLY SETTING FILM SENSITIVITY IN CAMERA

[76] Inventors: Takeo Saito; Shinji Nagaoka, both of 934-13, Shikawatashi, Yotsukaido-shi, Chiba-ken, Japan

[21] Appl. No.: 658,478

[22] Filed: Oct. 9, 1984

[30] Foreign Application Priority Data

Oct. 7, 1983 [JP] Japan ............................ 58-156668[U]

[51] Int. Cl.$^4$ .............................................. G03B 7/24
[52] U.S. Cl. ....................................................... 354/21
[58] Field of Search .......................................... 354/21

[56] References Cited

U.S. PATENT DOCUMENTS 4,173,401 11/1979 Harvey .................................... 354/21
4,309,089 1/1982 Harvey .................................... 354/21
4,349,272 9/1982 Holthusen .............................. 354/21

FOREIGN PATENT DOCUMENTS 66431 4/1982 Japan ..................................... 354/21

Primary Examiner—William B. Perkey
Attorney, Agent, or Firm—Robert E. Burns; Emmanuel J. Lobato; Bruce L. Adams

[57] ABSTRACT

A system for automatically setting the film sensitivity in a camera by reading the film sensitivity in terms of a code through an electric signal terminal attached to a film patrone of the camera and producing an electric signal for automatic exposure control, in which the read code signal is stored at a certain predetermined timing and this stored stable information is used during exposure.

8 Claims, 4 Drawing Figures

SYSTEM FOR AUTOMATICALLY SETTING FILM SENSITIVITY IN CAMERA

BACKGROUND OF THE INVENTION

The present invention relates generally to a system for automatically setting the film sensitivity in a camera, and more particularly to a system of the type in which a code corresponding to the film sensitivity is read through an electric signal terminal attached to a film patrone and which provides stable film sensitivity information during exposure control.

Among various methods for automating the operations of a camera, and as method of automatically setting the film sensitivity, there has been proposed a method in which an electric signal terminal is attached to a film patrone or package and the film sensitivity is read as a code signal and subjected to a calculation processing. In this case, plural electric contacts are provided on the camera side and connected to the terminal on the film patrone. But, as well known, the camera is provided with an auto focus mechanism, a shutter driving mechanism or a motor for sequence control, and it is likely that impact or vibration caused by the operation of these mechanisms will make the above electric contacts unstable and induce a change in information on the film sensitivity.

In the present invention, in view of the above-mentioned drawback, and, in order to provide stable information on the film sensitivity at least during exposure control, the information read from a film patrone is stored at a certain predetermined timing.

An embodiment of the present invention will be described hereinunder with reference to the drawings.

Figure 1:
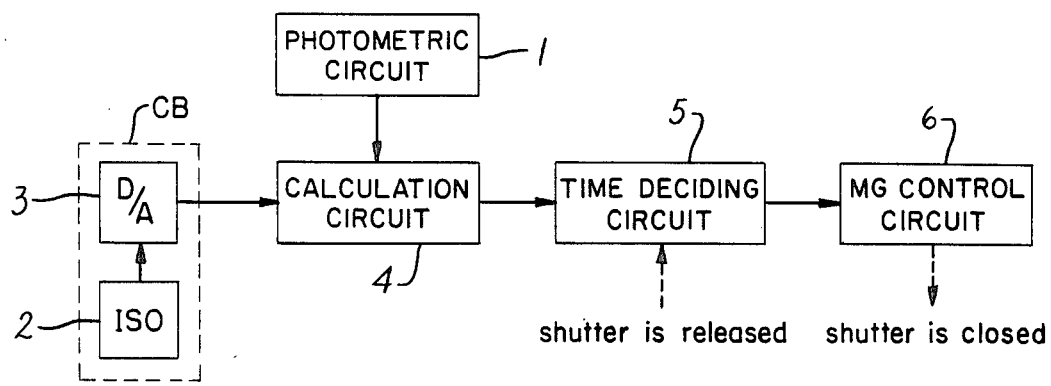
FIG. 1 is a block diagram of an exposure control circuit for an electric shutter.

Referring first to FIG. 1, there is shown a block diagram of an example of an exposure control circuit for a programmed electric shutter, in which the numeral 1 denotes a photometric circuit including a photo-detector element, the numeral 2 denotes a film sensitivity setting circuit, the numeral 3 denotes a film D/A converter for converting information which has been input as a digital code signal into an analog signal, the numeral 4 denotes a calculation circuit for the output of the photometric circuit and the film sensitivity information, the numeral 5 denotes a time-deciding circuit for deciding the shutter exposure time on the basis of the calculation results, and the numeral 6 denotes an electromagnet control circuit connected to an output terminal of the time-deciding circuit for controlling the closing of the shutter.

In the above system, the present invention aims at stabilizing the output from a circuit section CB enclosed with a dotted line, namely, the film sensitivity information.

Figure 2:
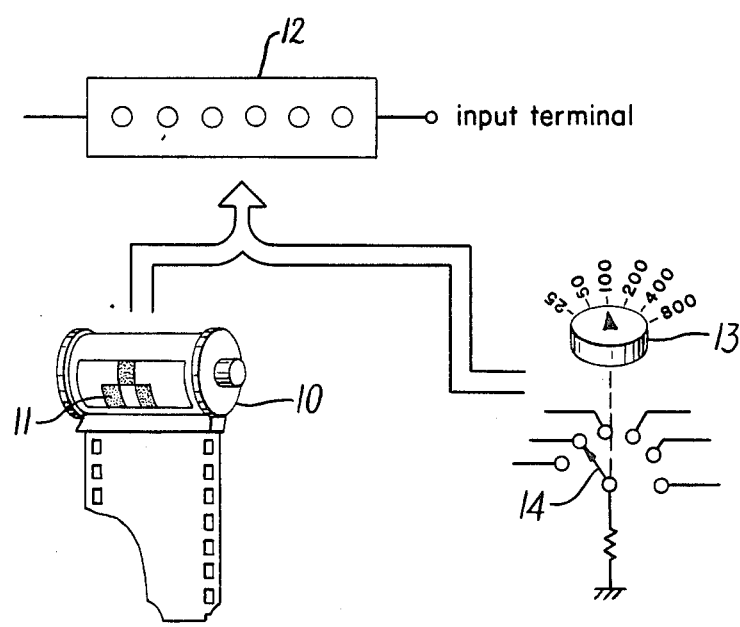
FIG. 2 is an explanatory view for explaining the AUTO Set and MANUAL Set inputs.

Referring now to FIG. 2, there is shown an example of inputting data in the case where a signal obtained at an electric contact 11 attached to a film patrone or package 10 is fed to an input terminal 12 on the camera side and also in the case of signal introduction through a contact 14 by operation of a manual setting dial 13.

Figure 3:
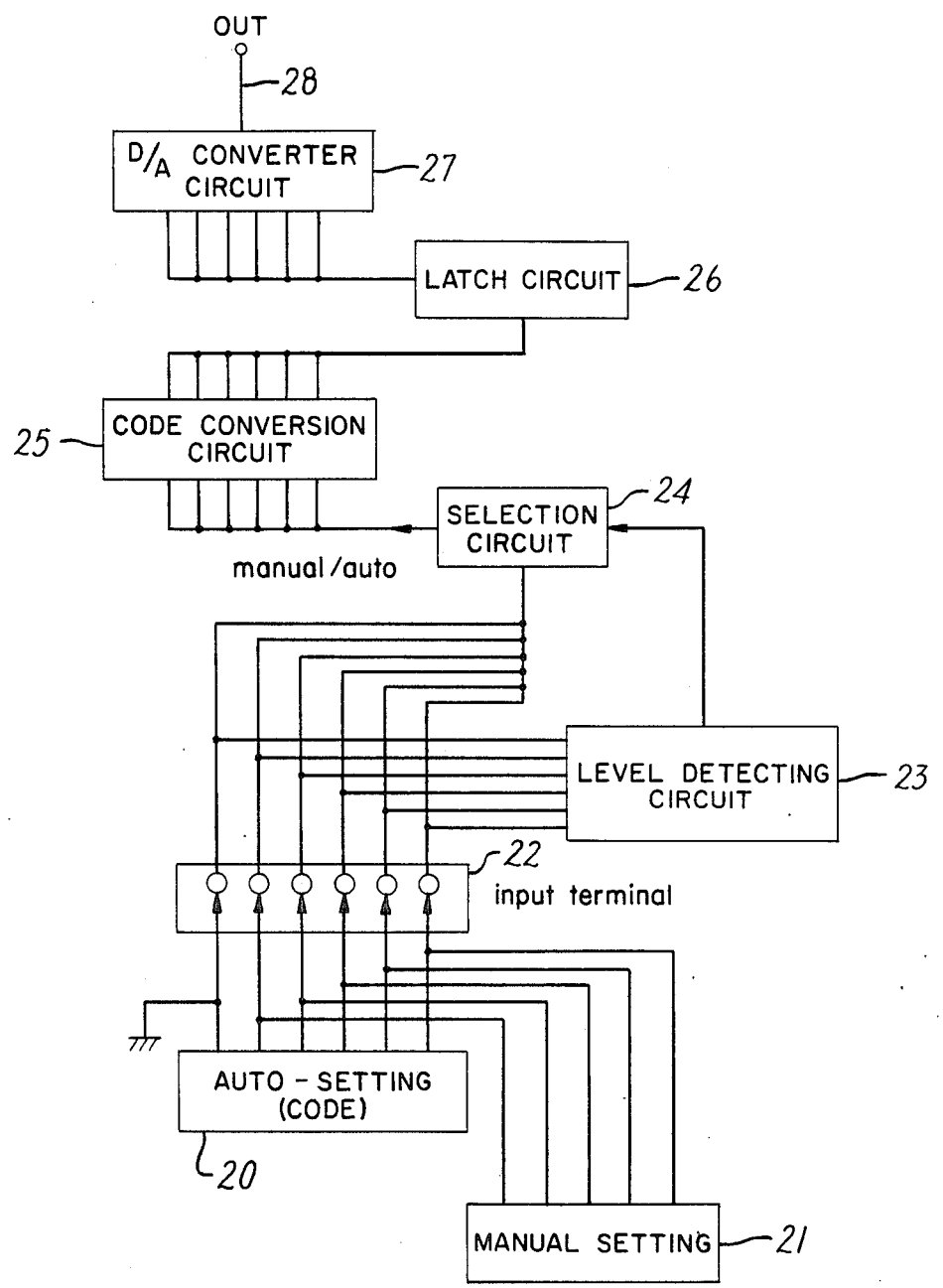
FIG. 3 is a block diagram of a system for automatically setting the film sensitivity according to the present invention.

FIG. 3 is a block diagram of a system for automatically setting the film sensitivity according to the present invention, illustrating in detail the construction of the circuit section CB, in which the numeral 20 denotes an input circuit for automatically setting the film sensitivity by utilization of an electric signal terminal on the film patrone as previously noted, the numeral 21 denotes a circuit for inputting the film sensitivity by manual setting, the numeral 22 denotes an input terminal, the numeral 23 denotes a level detecting circuit for judging whether the input signal is for AUTO setting or for MANUAL setting, and the numeral 24 denotes a selection circuit which operates in accordance with the results obtained in the level detecting circuit 23. In the case of AUTO setting, the output of the selection circuit 24 is converted to the corresponding film sensitivity signal through a code conversion circuit 25. Further, since further information is transmitted to a D/A converter 27 through a latch circuit 26, the digital signal which is produced by the code conversion circuit 25 is stored in the latch circuit and no longer affected at all by changes in the input signal caused by vibrations or impacts. In this way, the signal obtained from an output terminal 28 of the D/A converter is provided as a very stable signal at the time of exposure control for the shutter.

Figure 4:
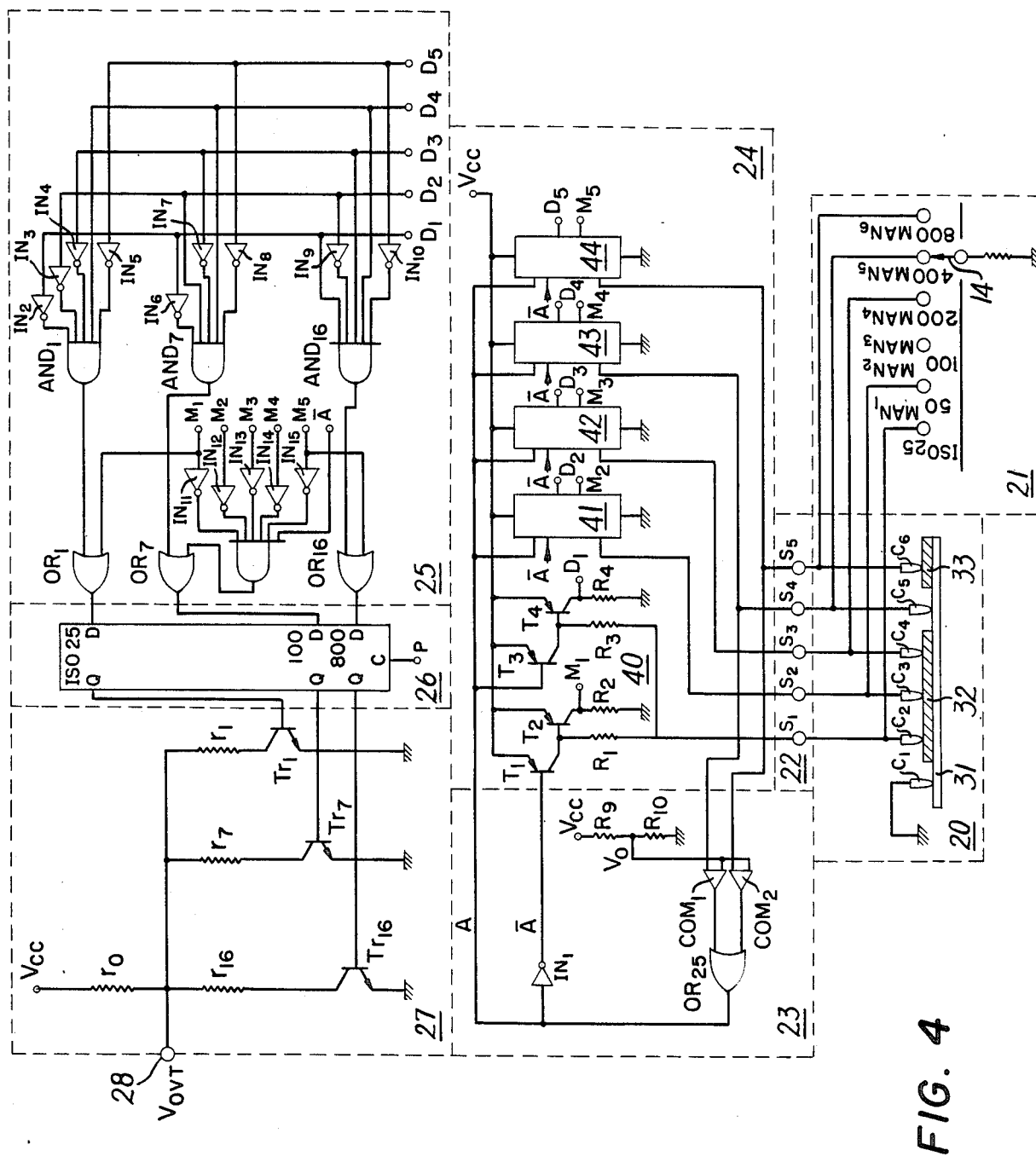
FIG. 4 is an embodiment of a circuit diagram of the system shown in FIG. 3.

Referring to FIG. 4, there is shown a specific example of a circuit configuration in the block diagram of FIG. 3, in which the numerals 20 and 27 represent blocks having the same functions as in the block diagram of FIG. 3, the numeral 31 to 33 represent code portions provided on the film patrone or package 10, the numeral 31 denoting a conductor and the numerals 32 and 33 denoting insulators. In the illustrated example, since code sections 1 and 5 are conductive portions, there is set a patrone having a film sensitivity of ISO 25. The reference marks $C_1$ to $C_6$ denote contact pins. In the manual set circuit section 21, a movable contact piece 14 is in contact with a terminal $MAN_5$, indicating that ISO 400 is set. The numeral 23 denotes a level detecting circuit section, in which COM and $COM_2$ represent voltage comparators whose non-inverted input terminals are connected to receive a reference voltage $V_O$ and whose inverted inputs are connected to input terminals $S_4$ and $S_5$, respectively. The outputs of the comparators are fed to an OR circuit 25, the output of which is applied to a selection circuit section 24 as AUTO signal A or as MANUAL signal $\overline{A}$ through an inverter $N_1$.

The selection circuit 24 comprises five circuit blocks 40 to 44 correspondingly to input terminals $S_1$ to $S_5$, although only the circuit 40 corresponding to the terminal $S_1$ is shown in the figure and the construction of the other circuit blocks are omitted. These circuits output signals $D_1$ to $D_5$ in the case of AUTO set and signals $M_1$ to $M_5$ in the case of MANUAL set. The numeral 25 denotes a code converting circuit section, showing only the cases of ISO 25, 100 and 800, to which are connected the signals $D_1$–$D_5$, $M_1$–$M_5$ and A. The numeral 26 denotes a latch circuit having D input terminals to which are connected code signals corresponding to the ISOs and having Q outputs being connected to a D/A converter circuit 27 of the subsequent stage. The C terminal of the latch circuit 26 is a timing input terminal for latching. A latch signal may be provided at the time of power supply to a terminal P or at a time when the camera is free of vibration, for example, after the elapse of a certain delay. Among transistors $Tr_1$ to $Tr_{16}$ in the D/A converter circuit section 27, only the transistor corresonding to the film sensitivity products. ($Tr_1$ to $Tr_6$ and $Tr_8$ to $Tr_{15}$ are not shown).

For example, in the case of ISO 25, only $Tr_1$ conducts and an electric current flows from a power source $V_{cc}$ through resistors $r_0$ and $r_1$ to ground, resulting in an output voltage $V_{OUT}$ as a divided voltage by resistors $r_0$ and $r_1$. The output voltage thus obtained in the D/A converter circuit 27 is applied to a terminal 28 and input to the calculation circuit 4 for exposure control.

According to the system for automatically setting the film sensitivity according to the present invention, digital information representative of the film sensitivity is stored and held by a latch circuit and it is utilized to prevent signals from the film patrone and the switch from becoming unstable due to vibration, etc. of the camera during exposure control, thus enhancing reliability.

We claim:

1. A system for automatically setting film sensitivity information in a camera comprising: plural input terminals; means for applying to the input terminals auto film sensitivity electric signals corresponding to automatically set film sensitivity information and manual film sensitivity electric signals corresponding to manually set film sensitivity information; level detecting circuit means for detecting the voltage level of the auto and manual film sensitivity signals and producing an auto output signal in response to detection of an auto film sensitivity signal and a manual output signal in response to detection of a manual film sensitivity signal; selection circuit means for selecting the auto film sensitivity signals or the manual film sensitivity signals in response to the auto or manual output signal; code converting circuit means responsive to the auto or manual film sensitivity signals selected by the selection circuit means for converting the same into corresponding digitally coded film sensitivity data representative of the selected film sensitivity information; latch circuit means for holding the digitally coded film sensitivity data; digital-to-analog converter circuit means for converting the digitally coded film sensitivity data held in the latch circuit means into a corresponding analog voltage; and exposure control circuit means responsive to the analog voltage for determining an exposure value based on the selected film sensitivity information.

2. A system according to claim 1; wherein the latch circuit means comprises a flip-flop circuit.

3. An automatic film sensitivity device for a camera of the type equipped to receive either a coded film package containing coded film sensitivity information or an uncoded film package and equipped to permit the manual selection of film sensitivity information when using an uncoded film package, the device comprising: plural input terminals; means for applying to the respective input terminals first electric film sensitivity signals corresponding to coded film sensitivity information contained on a coded film package and second electric film sensitivity signals corresponding to manually selected film sensitivity information; circuit means for selecting the first or second film sensitivity signals and converting the selected film sensitivity signals into corresponding digitally coded film sensitivity data; memory means for temporarily storing the digitally coded film sensitivity data; and digital-to-analog converting means for converting the digitally coded film sensitivity data stored in the memory means into a corresponding analog voltage representative of the selected film sensitivity information.

4. An automatic film sensitivity device according to claim 3; wherein the first and second film sensitivity signals have different voltage levels; and the circuit means includes level detecting means for discriminating between the first and second data signals by detecting the different voltage levels.

5. An automatic film sensitivity device according to claim 4; wherein the memory means comprises a latch circuit having inputs connected to receive the digitally coded film sensitivity data and outputs connected to the digital-to-analog converting means.

6. An automatic film sensitivity device according to claim 5; wherein this latch circuit includes means for effecting the transfer of the digitally coded film sensitivity data stored in the latch circuit to the digital-to-analog converting means in response to the application of a latch signal.

7. An automatic film sensitivity device according to claim 3; wherein the memory means comprises a latch circuit having inputs connected to receive the digitally coded film sensitivity data and outputs connected to the digital-to-analog converting means.

8. An automatic film sensitivity device according to claim 7; wherein the latch circuit includes means for effecting the transfer of the digitally coded film sensitivity data stored in the latch circuit to the digital-to-analog converting means in response to the application of a latch signal.

* * * * *